(12) United States Patent
Chuang

(10) Patent No.: US 11,235,828 B2
(45) Date of Patent: Feb. 1, 2022

(54) BICYCLE LUGGAGE RACK

(71) Applicant: Louis Chuang, Taichung (TW)

(72) Inventor: Louis Chuang, Taichung (TW)

(*) Notice: Subject to any disclaimer, the term of this patent is extended or adjusted under 35 U.S.C. 154(b) by 53 days.

(21) Appl. No.: 16/710,245

(22) Filed: Dec. 11, 2019

(65) Prior Publication Data

US 2020/0324842 A1 Oct. 15, 2020

(30) Foreign Application Priority Data

Apr. 15, 2019 (TW) .................................. 108113025

(51) Int. Cl.
*B62J 7/06* (2006.01)

(52) U.S. Cl.
CPC ........................................ *B62J 7/06* (2013.01)

(58) Field of Classification Search
CPC .......................................................... B62J 7/06
USPC ............................................................ 224/441
See application file for complete search history.

(56) References Cited

U.S. PATENT DOCUMENTS

| | | | | |
|---|---|---|---|---|
| 3,746,392 A * | 7/1973 | German | ..................... | B62J 1/16 297/380 |
| 4,269,335 A | 5/1981 | LaRose et al. | | |
| 4,410,116 A * | 10/1983 | Mattei | ....................... | B62J 7/04 224/424 |
| 4,562,944 A * | 1/1986 | Jackson | ..................... | B62J 9/00 224/417 |
| 5,257,727 A * | 11/1993 | Chen | ......................... | B62J 7/04 224/424 |
| 5,332,134 A * | 7/1994 | Chen | ......................... | B62J 7/04 224/422 |
| 5,340,003 A * | 8/1994 | Wilson | ...................... | B62J 7/08 224/415 |
| 5,411,190 A * | 5/1995 | Kortenbrede | ............. | B62J 7/04 224/422 |
| 5,417,629 A | 5/1995 | Phipps | | |
| 5,725,138 A * | 3/1998 | Zagrodnik | ................ | B62J 1/28 224/413 |
| 8,201,719 B2 * | 6/2012 | Hsu | .......................... | B62J 7/04 224/444 |

(Continued)

FOREIGN PATENT DOCUMENTS

| | | |
|---|---|---|
| CN | 2900311 Y | 5/2007 |
| CN | 102267515 A | 12/2011 |

(Continued)

*Primary Examiner* — Peter N Helvey
(74) *Attorney, Agent, or Firm* — Alan D. Kamrath; Karin L. Williams; Mayer & Williams PC

(57) ABSTRACT

A bicycle luggage rack includes a mounting rack and a supporting rack. The mounting rack includes a first sliding portion having a first end and a second end opposite to the first end. The first sliding portion further includes an arcuate portion between the first and second ends. The supporting rack is disposed on top of the mounting rack. The supporting rack includes a second sliding portion and a placement surface. The second sliding portion is slidably disposed on the first sliding portion and is slidable along the arcuate portion. An angle between the placement surface and the mounting rack is varied while the second sliding portion slides along the arcuate portion of the first sliding portion. The level of the placement surface is varied while the second sliding portion slides along the arcuate portion of the first sliding portion.

9 Claims, 19 Drawing Sheets

(56) References Cited

U.S. PATENT DOCUMENTS

| | | | |
|---|---|---|---|
| 8,985,416 B2 | 3/2015 | Schanz et al. | |
| 9,452,799 B2 * | 9/2016 | Maguire | B62J 9/20 |
| 10,513,299 B2 * | 12/2019 | MacMorran | B62H 5/001 |
| 2008/0011031 A1 | 1/2008 | Chuang | |
| 2012/0061434 A1 * | 3/2012 | Giguere | B62J 7/04 |
| | | | 224/412 |
| 2013/0292438 A1 | 11/2013 | Armstrong et al. | |
| 2015/0210334 A1 * | 7/2015 | Armstrong | B62J 9/21 |
| | | | 74/551.8 |
| 2016/0362155 A1 * | 12/2016 | Ton | B62J 7/04 |
| 2018/0050755 A1 * | 2/2018 | Walter | B62K 5/06 |
| 2020/0130764 A1 * | 4/2020 | Phillips | B62J 9/20 |

FOREIGN PATENT DOCUMENTS

| | | |
|---|---|---|
| CN | 202414028 U | 9/2012 |
| CN | 204775651 U | 11/2015 |
| DE | 202006014301 U1 | 11/2006 |
| DE | 102011118867 A1 | 5/2013 |
| DE | 202015002490 U1 | 4/2015 |
| EP | 1650119 A2 | 4/2006 |
| TW | 496351 U | 7/2002 |
| TW | I239924 B | 9/2005 |
| TW | 200740649 A | 11/2007 |
| TW | M350499 U | 2/2009 |
| TW | M371675 U | 1/2010 |
| WO | 0024628 A1 | 5/2000 |
| WO | 2011028449 A2 | 3/2011 |

\* cited by examiner

BICYCLE LUGGAGE RACK

BACKGROUND OF THE INVENTION

The present invention relates to a bicycle luggage rack and, more particularly, to a bicycle luggage rack suitable for bicycle frames of different sizes and different angles.

Taiwan Patent No. 1239924 discloses an angle-adjustable luggage rack including an adjusting device pivotably mounted between a coupler and a frame. When the adjusting device is in a first position, the adjusting device is pivotable between the coupler and the frame, permitting a user to adjust the inclining angle and the level of the frame according to need. When the adjusting device is in a second position, the adjusting device can reliably position the frame. Since the adjusting device is pivotably mounted between the coupler and the frame, the inclining angle and the level of the frame can be freely adjusted.

Generally, a bicycle luggage rack must have a specific specification corresponding to the type of the bicycle frame to maintain the bicycle luggage rack in a horizontal state after being mounted on the bicycle frame. Nevertheless, bicycle luggage racks of suitable sizes cannot be found in some cases, such that the above angle-adjustable luggage rack is used for application on bicycle frames of different types. However, the angle-adjustable luggage rack provides the angle adjusting effect through a pivoting structure, such that when the luggage rack is under a heavy load and when the bicycle is running through a rugged road surface, the pivoting structure easily causes drooping of the luggage rack due to the heavy load.

Thus, a need exists for a novel bicycle luggage rack that mitigates and/or obviates the above disadvantages.

BRIEF SUMMARY OF THE INVENTION

The primary objective of the present invention is to provide a bicycle luggage rack including a mounting rack and a supporting rack. The mounting rack includes a first sliding portion having a first end and a second end opposite to the first end. The first sliding portion further includes an arcuate portion between the first end and the second end. The supporting rack is disposed on top of the mounting rack. The supporting rack includes a second sliding portion and a placement surface. The second sliding portion is slidably disposed on the first sliding portion and is slidable along the arcuate portion between the first end and the second end of the first sliding portion. An angle between the placement surface and the mounting rack is varied while the second sliding portion slides along the arcuate portion of the first sliding portion. The level of the placement surface is varied while the second sliding portion slides along the arcuate portion of the first sliding portion.

In an example, a center of curvature of the first sliding portion is located on a side of the first sliding portion distant to the supporting rack.

In an example, the first sliding portion includes a first tube and a first sliding block slidably received in the first tube. The first tube is mounted between the first and second ends of the first sliding portion and includes the arcuate portion. The second sliding portion is securely coupled to the first sliding block, permitting joint sliding movement of the second sliding portion 31 and the first sliding block relative to the first tube.

In an example, the mounting rack further includes a first mounting member connected to the first sliding portion. A first coupling member and a first tightening strap are mounted to the first mounting member. The first tightening strap includes a first end fixed to the first coupling member and a second end connected to a first buckle. The first buckle is releasably coupled to the first coupling member.

In an example, the first end of the first sliding portion is connected to the first mounting member. The mounting rack includes a first supporting rod having a first end connected to the first mounting member and a second end connected to the second end of the first sliding portion.

In an example, the first coupling member and the first tightening strap are adjacent to the first end of the first sliding portion. A second coupling member and a second tightening strap are mounted to the first mounting member. The second tightening strap includes a first end fixed to the second coupling member and a second end connected to a second buckle. The second buckle is releasably coupled to the second coupling member.

In an example, the mounting rack includes a third sliding portion having a first end and a second end opposite to the first end. The third sliding portion further includes an arcuate portion between the first end and the second end of the third sliding portion. The third sliding portion includes a second tube and a second sliding block slidably received in the second tube. The second tube is mounted between the first and second ends of the third sliding portion and includes the arcuate portion of the third sliding portion. A second mounting member is connected to the first end of the third sliding portion. A third coupling member and a third tightening strap are mounted to the second mounting member. The third tightening strap includes a first end fixed to the third coupling member and a second end connected to a third buckle. The third buckle is releasably coupled to the third coupling member. The mounting rack includes a second supporting rod having a first end connected to the second mounting member and a second end connected to the second end of the third sliding portion. The third coupling member and the third tightening strap are adjacent to the first end of the third sliding portion. A fourth coupling member and a fourth tightening strap are mounted to the second mounting member. The fourth tightening strap includes a first end fixed to the fourth coupling member and a second end connected to a fourth buckle. The fourth buckle is releasably coupled to the fourth coupling member. The supporting rack includes a fourth sliding portion connected to the second sliding block. The fourth sliding portion is slidable along the arcuate portion between the first and second ends of the third sliding portion. The center of curvature of the third sliding portion is located on a side of the third sliding portion distant to the supporting rack.

In an example, the mounting rack includes a connecting rod that is substantially U-shaped. The connecting rod includes a first end connected to the second end of the first sliding portion and a second end connected to the second end of the third sliding portion.

In an example, the first mounting member and the second mounting member are located on a first reference plane. The placement surface is located on a second reference plane at an angle to the first reference plane. The angle between the first and second reference planes is between 65° and 90°.

In another example, the angle between the first and second reference planes is between 30° and 70°.

The present invention will become clearer in light of the following detailed description of illustrative embodiments of this invention described in connection with the drawings.

DETAILED DESCRIPTION OF THE INVENTION

Figure 1:
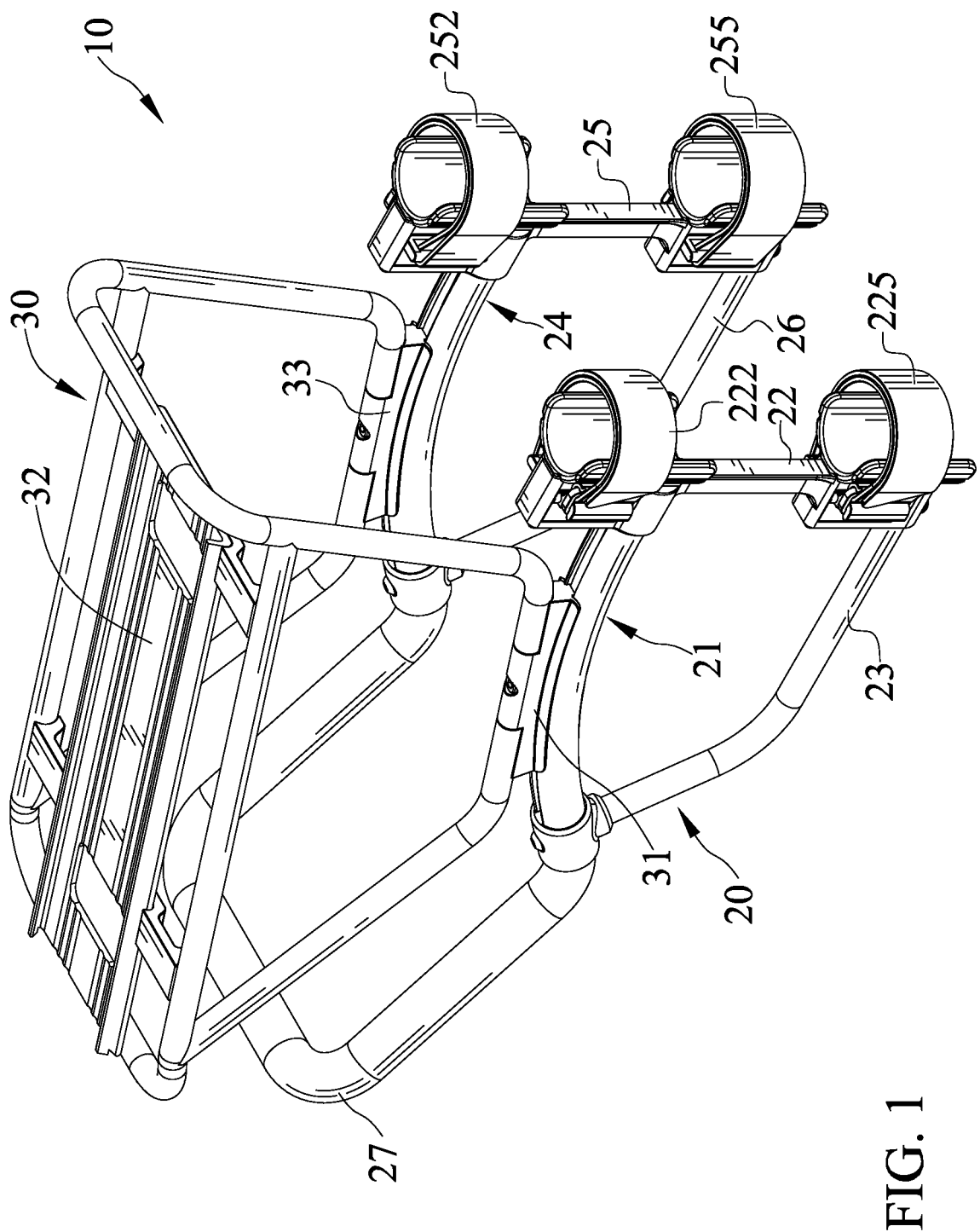
FIG. 1 is a perspective view of a bicycle luggage rack of a first embodiment according to the present invention.
Figure 2:
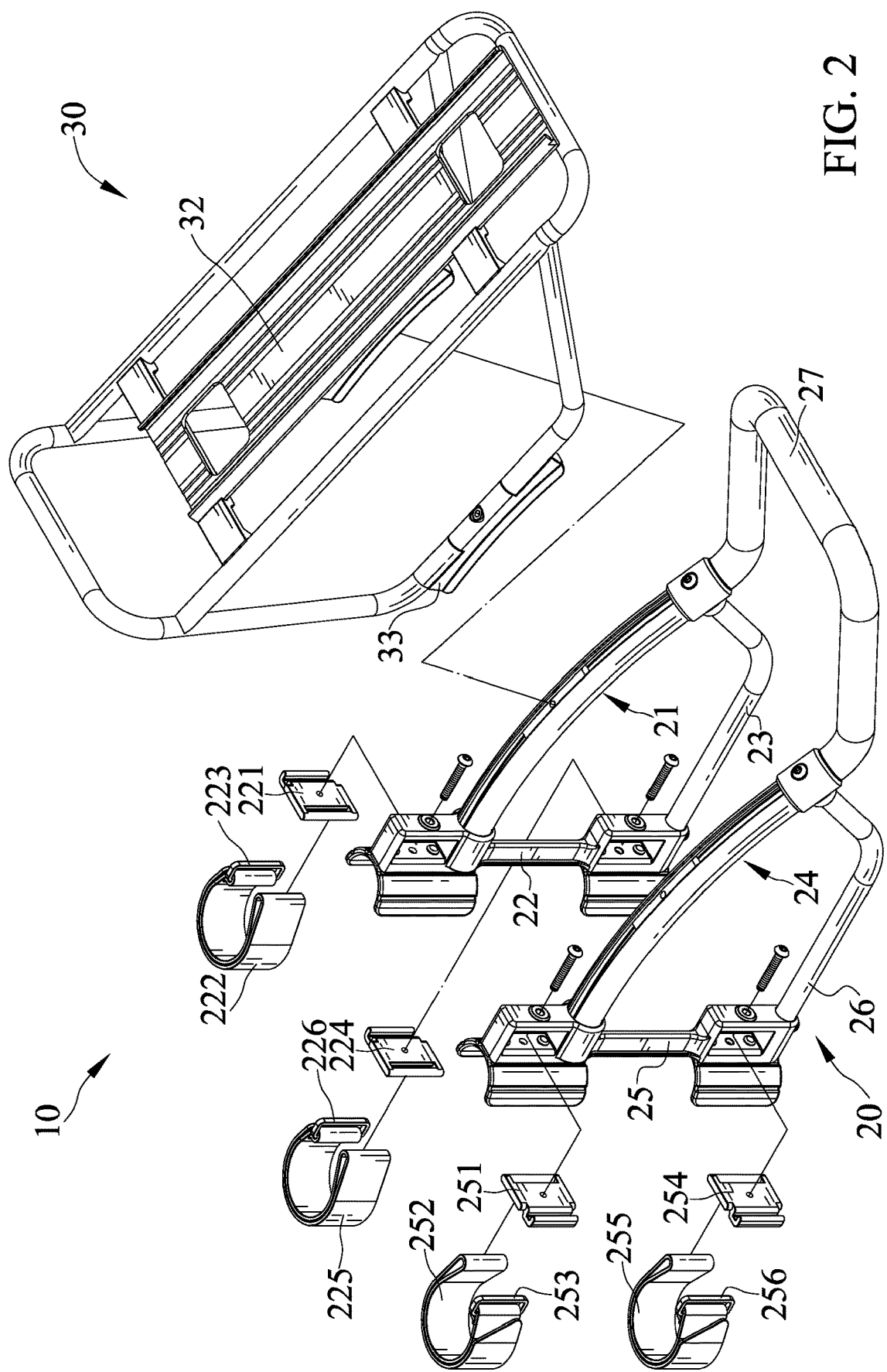
FIG. 2 is an exploded, perspective view of the bicycle luggage rack of FIG. 1.

With reference to FIGS. 1-8, a bicycle luggage rack 10 of a first embodiment according to the present invention includes a mounting rack 20 and a supporting rack 30. The mounting rack 20 includes a first sliding portion 21 having a first end 211 and a second end 212 opposite to the first end 211. The first sliding portion 21 further includes an arcuate portion between the first end 211 and the second end 212.

The first sliding portion 21 includes a first tube 213 and a first sliding block 214 slidably received in the first tube 213. The first tube 213 is mounted between the first and second ends 211 and 212 of the first sliding portion 21 and includes the arcuate portion.

The mounting rack 20 further includes a first mounting member 22 connected to the sliding portion 21. A first coupling member 221 and a first tightening strap 222 are mounted to the first mounting member 22. The first tightening strap 222 includes a first end fixed to the first coupling member 221 and a second end connected to a first buckle 223. The first buckle 223 is releasably coupled to the first coupling member 221.

The first end 211 of the first sliding portion 21 is connected to the first mounting member 22. The mounting rack 20 includes a first supporting rod 23 having a first end connected to the first mounting member 22 and a second end connected to the second end 212 of the first sliding portion 21.

The first coupling member 221 and the first tightening strap 222 are adjacent to the first end 211 of the first sliding portion 21. A second coupling member 224 and a second tightening strap 225 are mounted to the first mounting member 22. The second tightening strap 225 includes a first end fixed to the second coupling member 224 and a second end connected to a second buckle 226. The second buckle 226 is releasably coupled to the second coupling member 224.

The supporting rack 30 is disposed on top of the mounting rack 20. The supporting rack 30 includes a second sliding portion 31 and a placement surface 32. The second sliding portion 31 is slidably disposed on the first sliding portion 21. In this embodiment, the second sliding portion 31 is connected to the first sliding block 214. The second sliding portion 31 is slidable along the arcuate portion between the first end 211 and the second end 212 of the first sliding portion 21. An angle between the placement surface 32 and the mounting rack 20 is varied while the second sliding portion 31 slides along the arcuate portion of the first sliding portion 21. Furthermore, the level of the placement surface 32 is varied while the second sliding portion 31 slides along the arcuate portion of the first sliding portion 21. The center of curvature of the first sliding portion 21 is located on a side of the first sliding portion 21 distant to the supporting rack 30.

The mounting rack 20 includes a third sliding portion 24 having a first end 241 and a second end 242 opposite to the first end 241. The third sliding portion 24 further includes an arcuate portion between the first end 241 and the second end 242 of the third sliding portion 24. The third sliding portion 24 includes a second tube 243 and a second sliding block 244 slidably received in the second tube 243. The second tube 243 is mounted between the first and second ends 241 and 242 of the third sliding portion 21 and includes the arcuate portion of the third sliding portion 24.

A second mounting member 25 is connected to the first end 241 of the third sliding portion 24. A third coupling member 251 and a third tightening strap 252 are mounted to the second mounting member 25. The third tightening strap 252 includes a first end fixed to the third coupling member 251 and a second end connected to a third buckle 253. The third buckle 253 is releasably coupled to the third coupling member 251.

The mounting rack 20 further includes a second supporting rod 26 having a first end connected to the second mounting member 25 and a second end connected to the second end 242 of the third sliding portion 24. The third coupling member 251 and the third tightening strap 252 are adjacent to the first end 241 of the third sliding portion 24. A fourth coupling member 254 and a fourth tightening strap 255 are mounted to the second mounting member 25. The fourth tightening strap 255 includes a first end fixed to the fourth coupling member 254 and a second end connected to a fourth buckle 256. The fourth buckle 256 is releasably coupled to the fourth coupling member 254.

Figure 3:
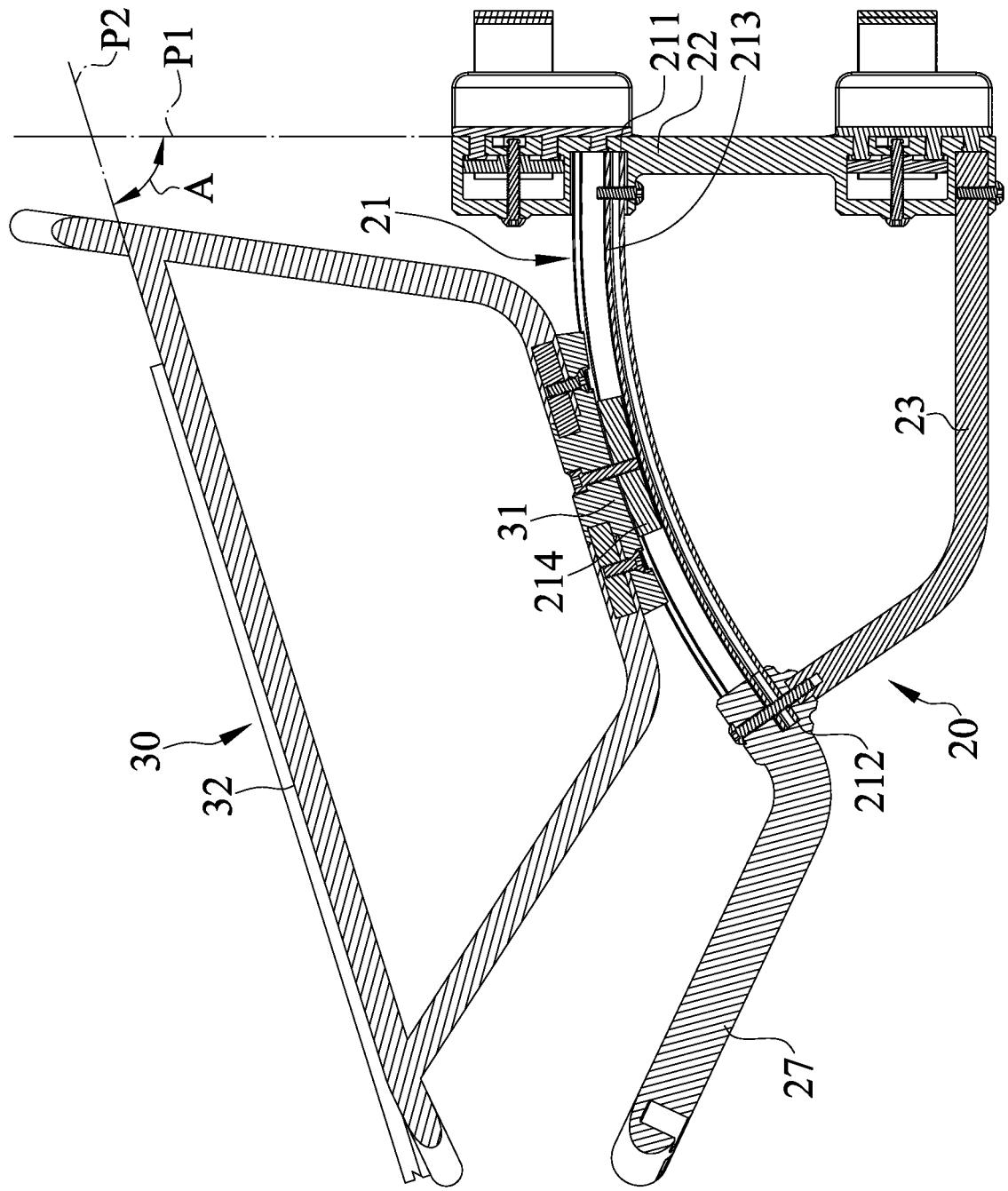
FIG. 3 is a cross sectional view illustrating a first sliding portion of the bicycle luggage rack of FIG. 1.

With reference to FIG. 3, the first mounting member 22 and the second mounting member 25 are located on a first reference plane P1. The placement surface 32 is located on a second reference plane P2 at an angle A to the first reference plane P1. The angle A between the first and second reference planes P1 and P2 is between 65° and 90°.

The mounting rack 20 includes a connecting rod 27 that is substantially U-shaped. The connecting rod 27 includes a first end connected to the second end 212 of the first sliding portion 21 and a second end connected to the second end 242 of the third sliding portion 24.

The supporting rack 30 includes a fourth sliding portion 33 slidably mounted to the third sliding portion 24. In this embodiment, the fourth sliding portion 33 is connected to the second sliding block 244. The fourth sliding portion 33 is slidable along the arcuate portion between the first and second ends 241 and 242 of the third sliding portion 24. The center of curvature of the third sliding portion 24 is located on a side of the third sliding portion 24 distant to the supporting rack 30.

Figure 3A:
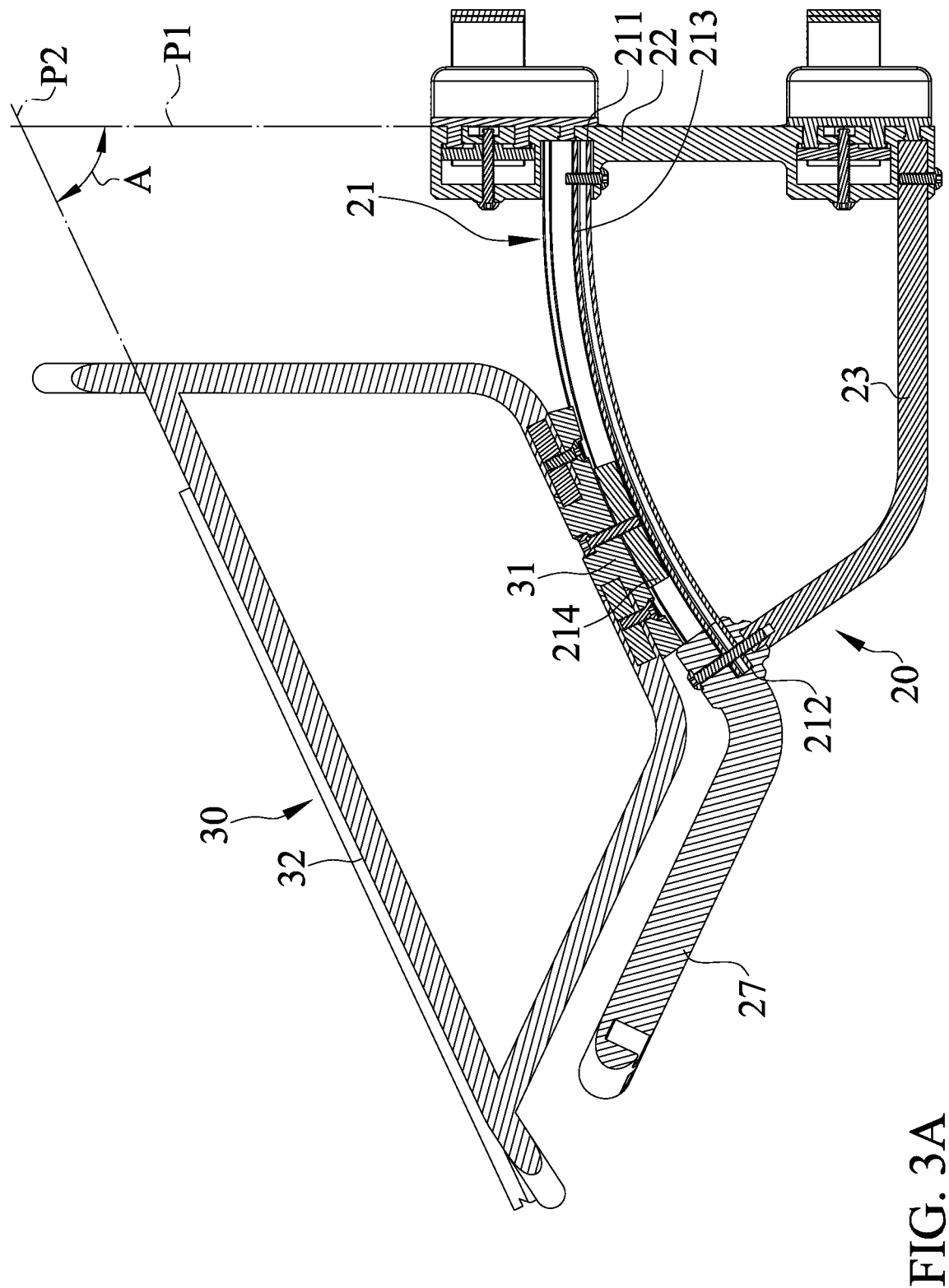
FIG. 3A is a cross sectional view similar to FIG. 3 with a supporting rack moved to the lowest position.
Figure 3B:
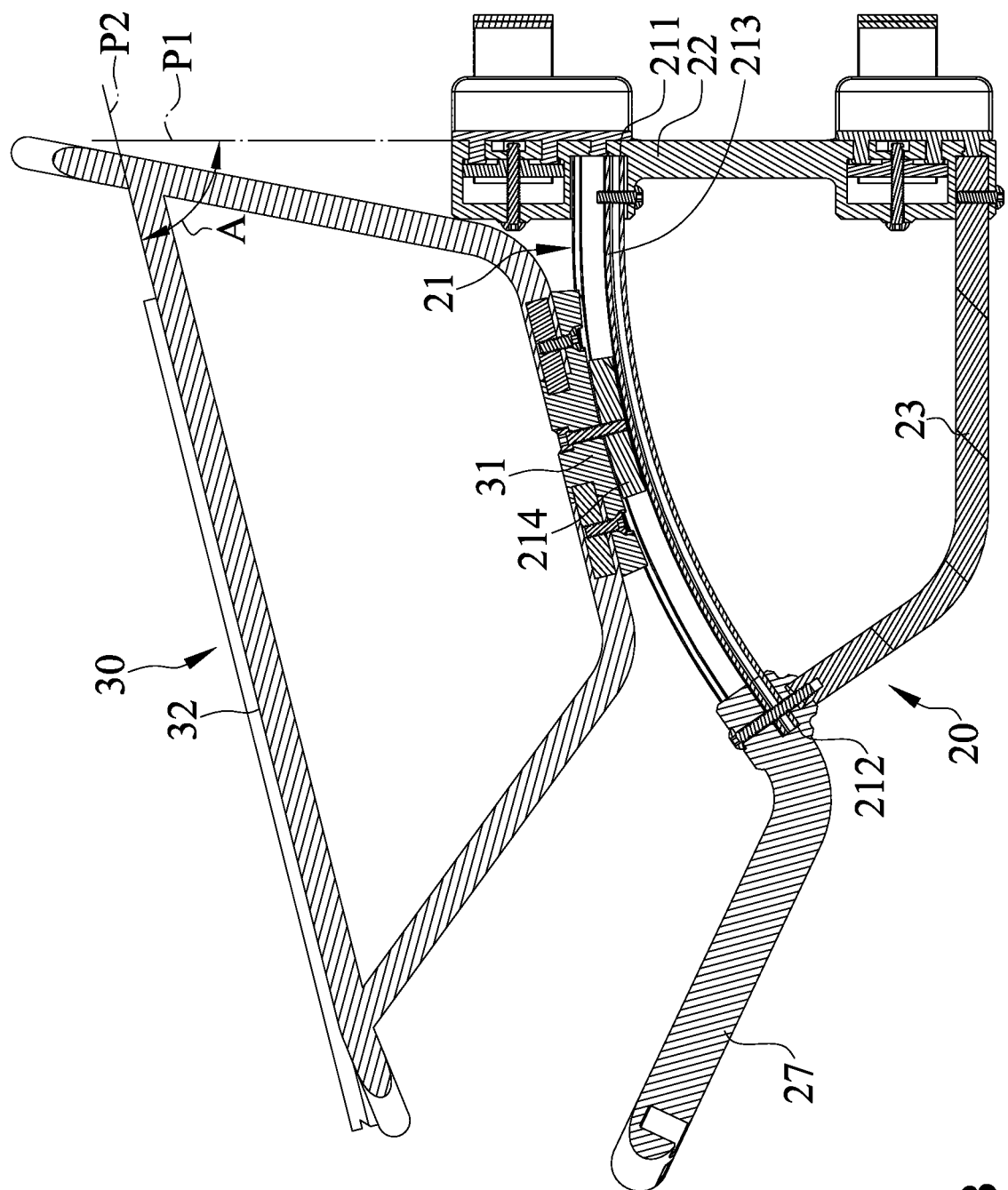
FIG. 3B is a cross sectional view similar to FIG. 3 with the supporting rack moved to the highest position.
Figure 4:
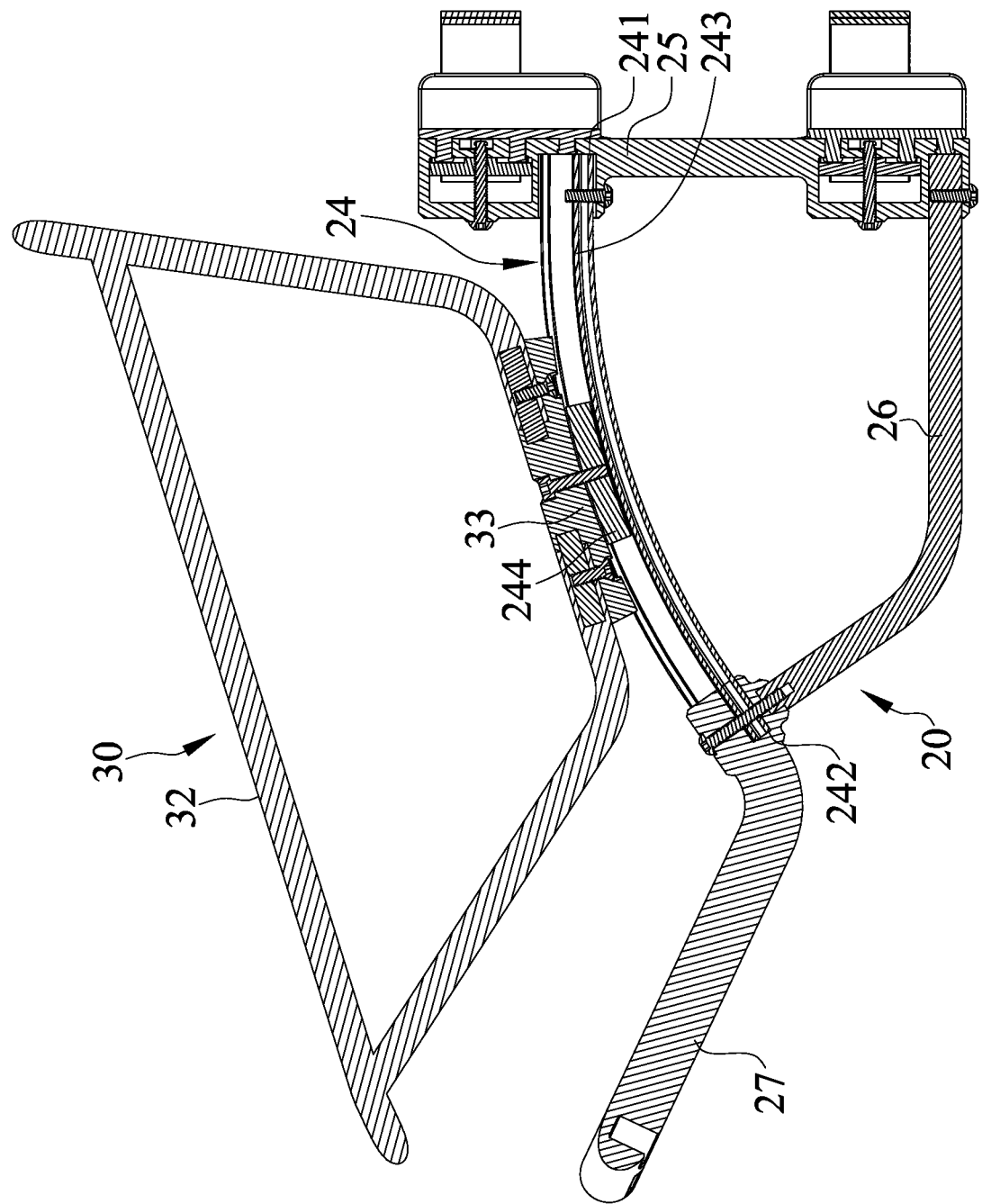
FIG. 4 is a cross sectional view illustrating a third sliding portion of the bicycle luggage rack of FIG. 1.
Figure 5:
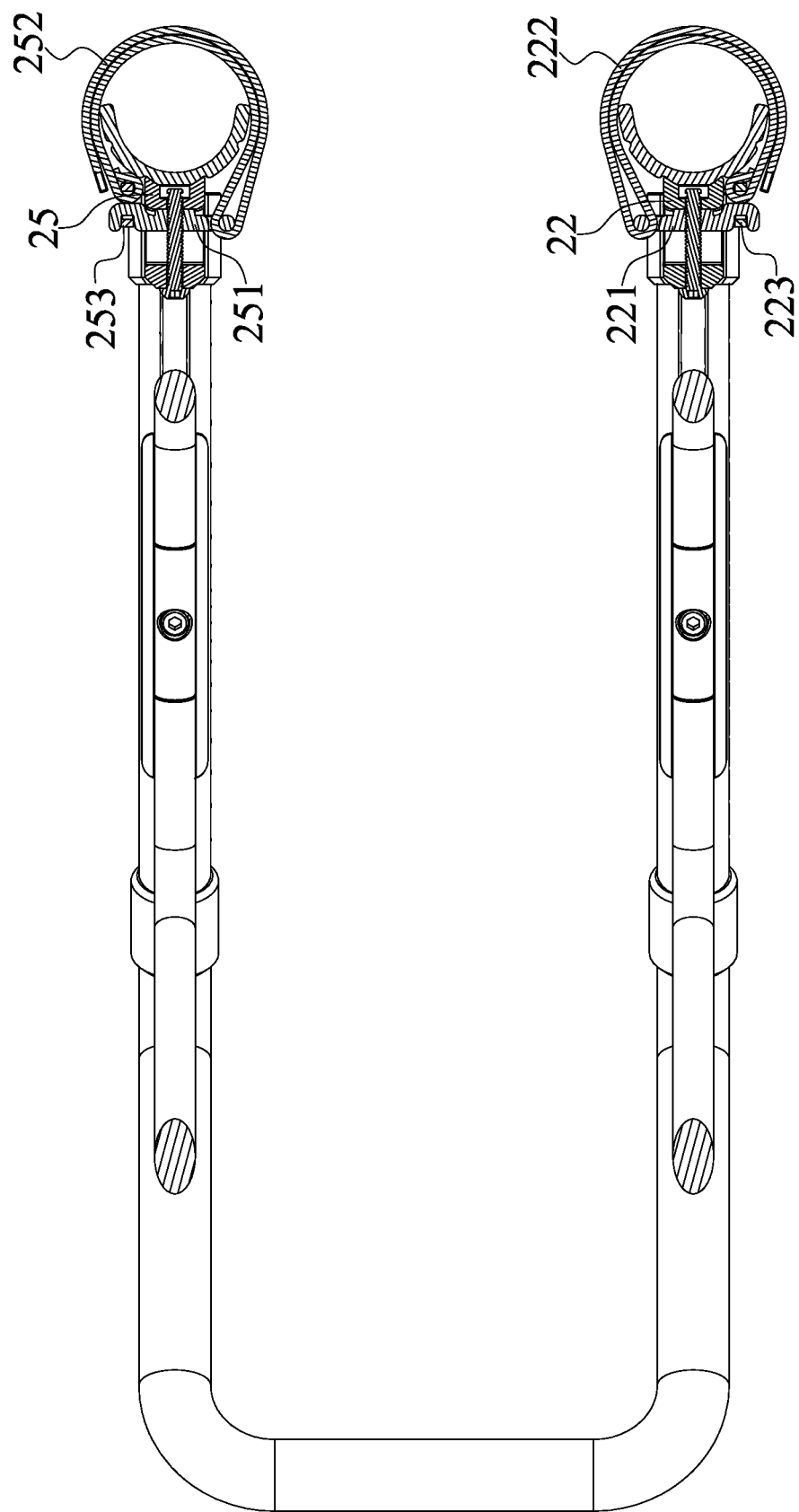
FIG. 5 is a cross sectional view illustrating a first tightening strap of the bicycle luggage rack of FIG. 1.
Figure 6:
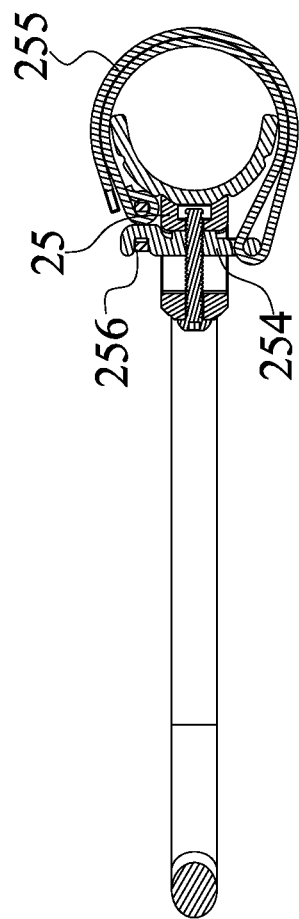
FIG. 6 is a cross sectional view illustrating a second tightening strap of the bicycle luggage rack of FIG. 1.
Figure 6:
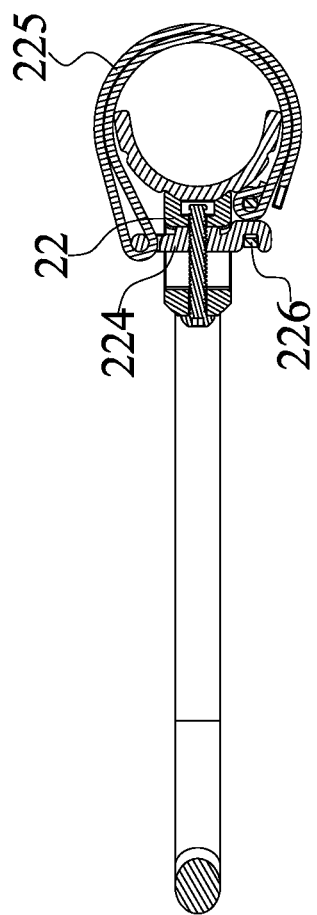
Figure 7:
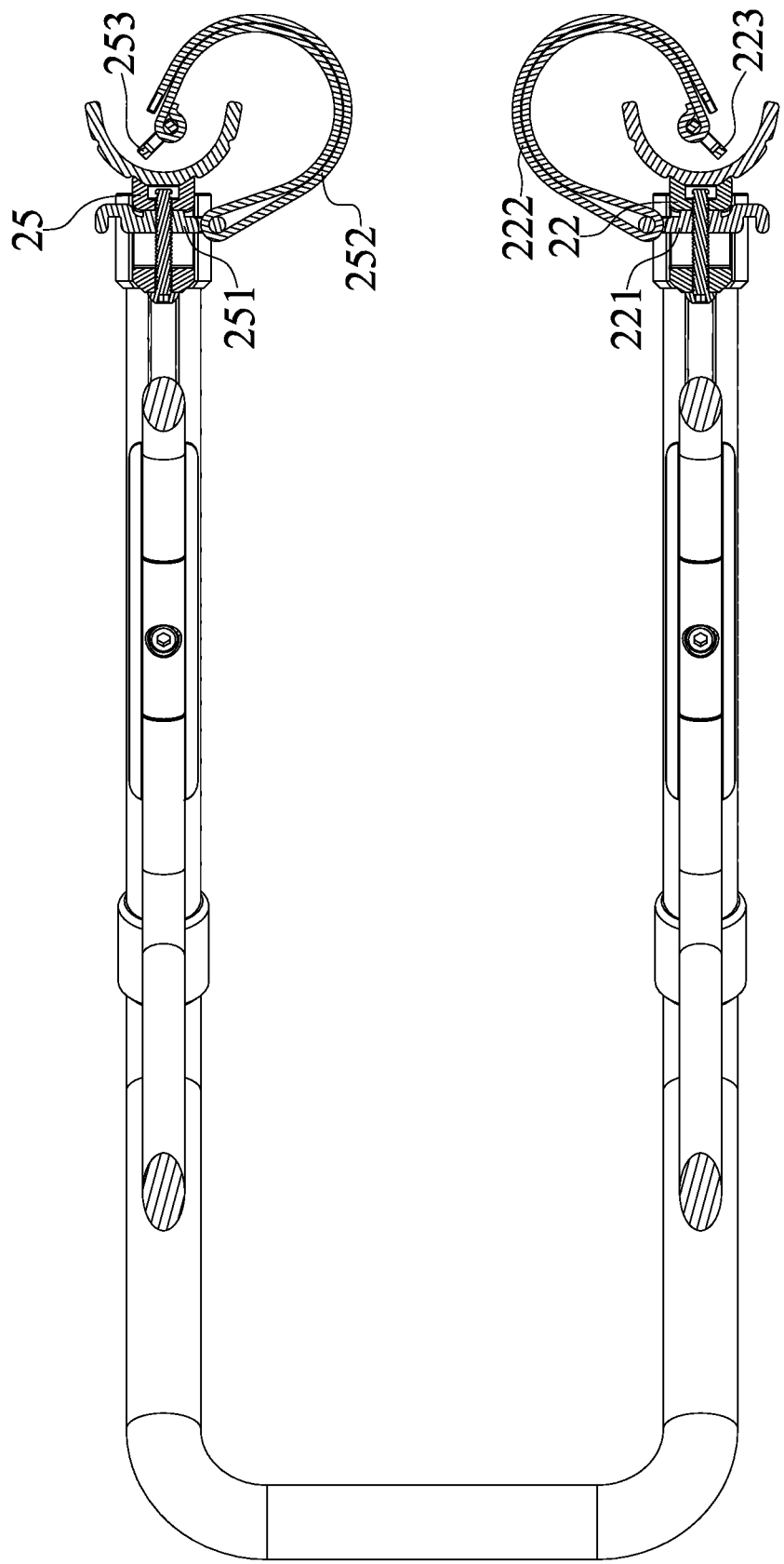
FIG. 7 is a cross sectional view similar to FIG. 5, illustrating disengagement of a first buckle from a first coupling member.
Figure 8:
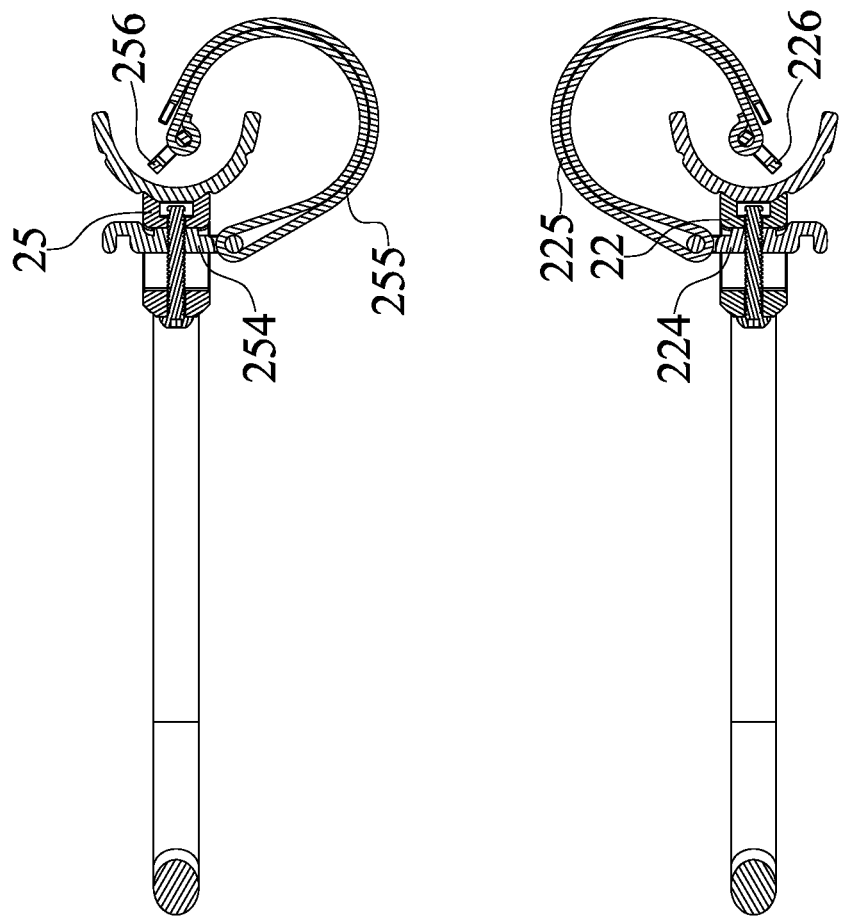
FIG. 8 is a cross sectional view illustrating disengagement of a second buckle from a second coupling member.
Figure 9:
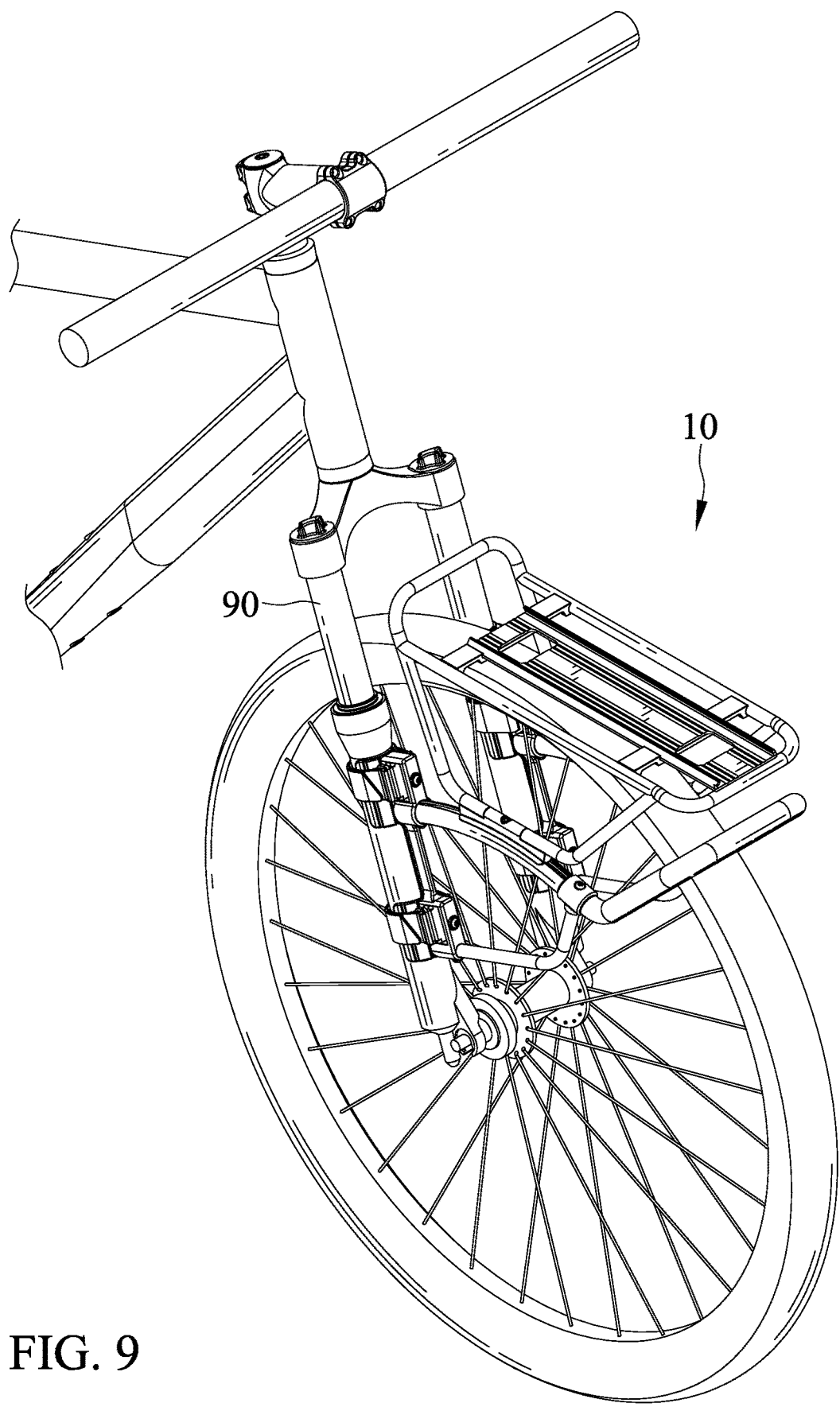
FIG. 9 is a diagrammatic perspective view illustrating use of the bicycle luggage rack of FIG. 1 on two fork blades of a front fork of a bicycle.
Figure 10:
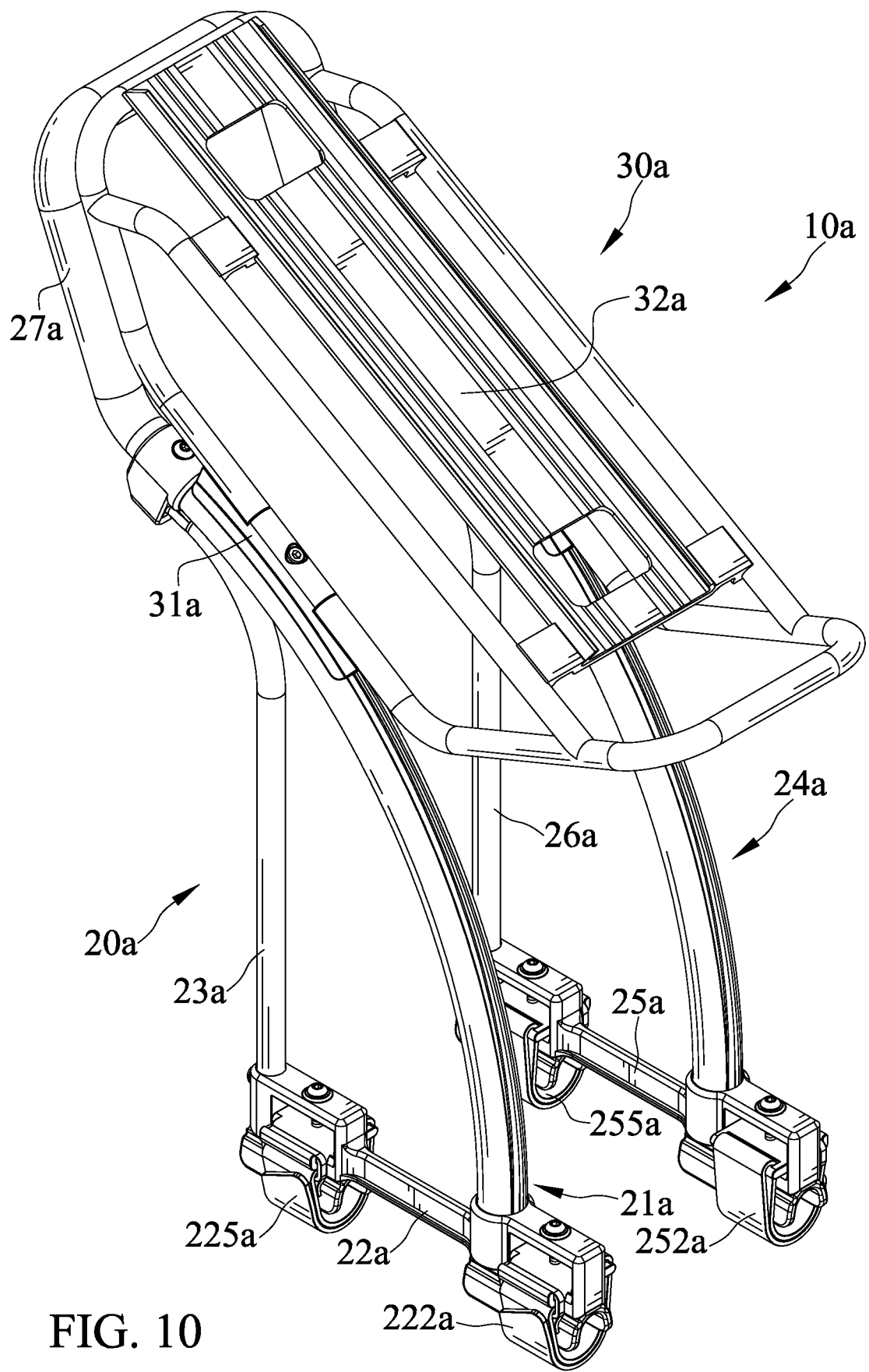
FIG. 10 is a perspective view of a bicycle luggage rack of a second embodiment according to the present invention.
Figure 11:
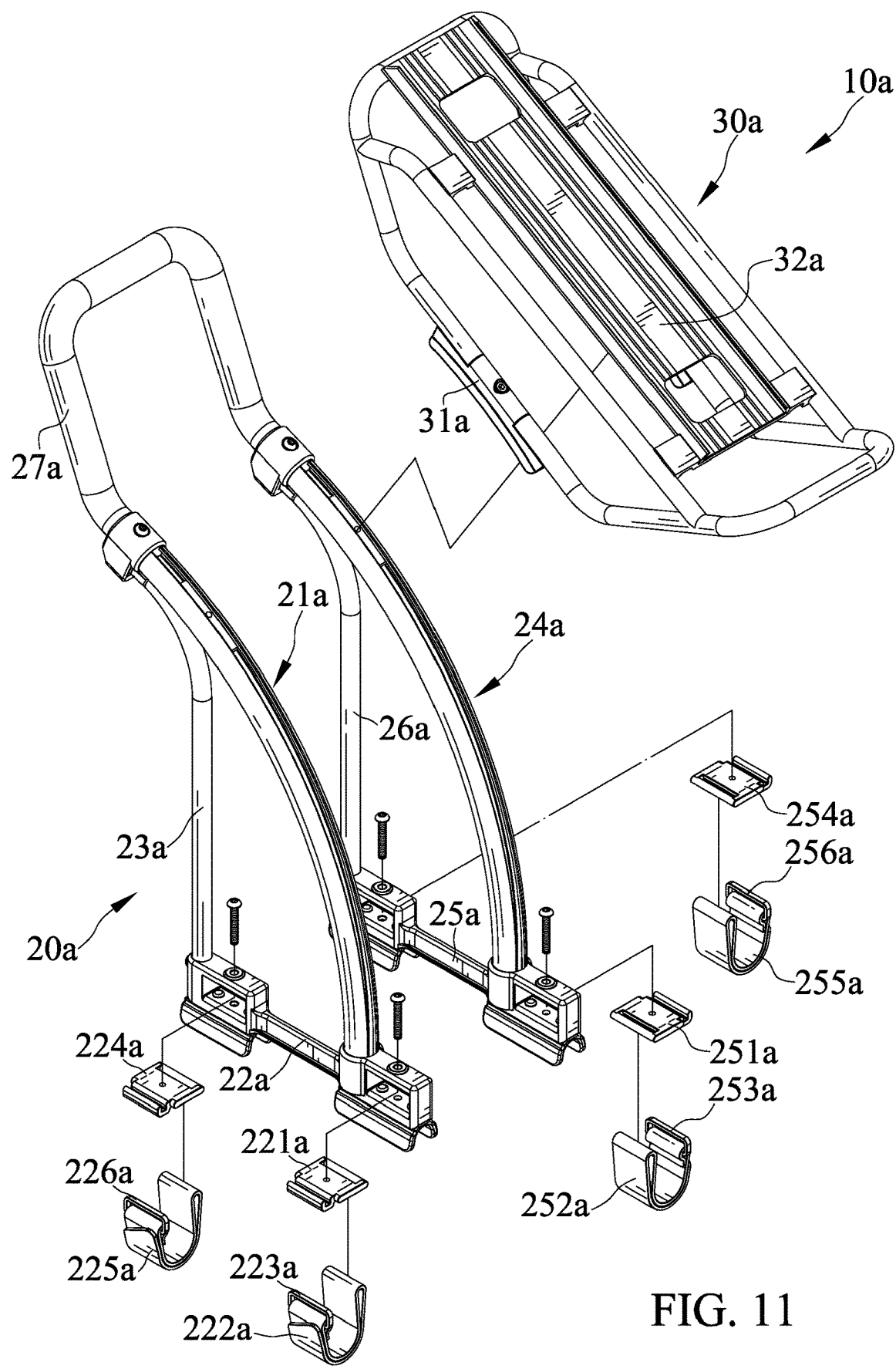
FIG. 11 is an exploded, perspective view of the bicycle luggage rack of FIG. 10.

With reference to FIG. 9, the bicycle luggage rack 10 of the first embodiment according to the present invention can be mounted on two fork blades of a front fork 90 of a bicycle. As shown in FIGS. 3A and 3B, the angular position of the placement surface 32 is varied while the second sliding portion 31 slides along the arcuate portion of the first sliding portion 21. Furthermore, the level of the placement surface 32 is varied while the second sliding portion 31 slides along the arcuate portion of the first sliding portion 21. The bicycle luggage rack 10 can be used on various bicycle front forks of different angles. Furthermore, by changing the angular position of the placement surface 32, the placement surface 32 can be adjusted to locate in a horizontal plane while increasing the structural strength of the bicycle luggage rack 10.

With reference to FIGS. 10-15, a bicycle luggage rack 10a of a second embodiment according to the present invention includes a mounting rack 20a and a supporting rack 30a. The mounting rack 20a includes a first sliding portion 21a having a first end 211a and a second end 212a opposite to the first end 211a. The first sliding portion 21a further includes an arcuate portion between the first end 211a and the second end 212a.

The first sliding portion 21a includes a first tube 213a and a first sliding block 214a slidably received in the first tube 213a. The first tube 213a is mounted between the first and second ends 211a and 212a of the first sliding portion 21a and includes the arcuate portion.

The mounting rack 20a further includes a first mounting member 22a connected to the sliding portion 21a. A first coupling member 221a and a first tightening strap 222a are mounted to the first mounting member 22a. The first tightening strap 222a includes a first end fixed to the first coupling member 221a and a second end connected to a first buckle 223a. The first buckle 223a is releasably coupled to the first coupling member 221a.

The first end 211a of the first sliding portion 21a is connected to the first mounting member 22a. The mounting rack 20a includes a first supporting rod 23a having a first end connected to the first mounting member 22a and a second end connected to the second end 212a of the first sliding portion 21a.

The first coupling member 221a and the first tightening strap 222a are adjacent to the first end 211a of the first sliding portion 21a. A second coupling member 224a and a second tightening strap 225a are mounted to the first mounting member 22a. The second tightening strap 225a includes a first end fixed to the second coupling member 224a and a second end connected to a second buckle 226a. The second buckle 226a is releasably coupled to the second coupling member 224a.

The supporting rack 30a is disposed on top of the mounting rack 20a. The supporting rack 30a includes a second sliding portion 31a and a placement surface 32a. The second sliding portion 31a is slidably disposed on the first sliding portion 21a. In this embodiment, the second sliding portion 31a is connected to the first sliding block 214a. The second sliding portion 31a is slidable along the arcuate portion between the first end 211a and the second end 212a of the first sliding portion 21a. An angle between the placement surface 32a and the mounting rack 20a is varied while the second sliding portion 31a slides along the arcuate portion of the first sliding portion 21a. Furthermore, the level of the placement surface 32a is varied while the second sliding portion 31a slides along the arcuate portion of the first sliding portion 21a. The center of curvature of the first sliding portion 21a is located on a side of the first sliding portion 21a distant to the supporting rack 30a.

The mounting rack 20a includes a third sliding portion 24a having a first end 241a and a second end 242a opposite to the first end 241a. The third sliding portion 24a further includes an arcuate portion between the first end 241a and the second end 242a of the third sliding portion 24a. The third sliding portion 24a includes a second tube 243a and a second sliding block 244a slidably received in the second tube 243a. The second tube 243a is mounted between the first and second ends 241a and 242a of the third sliding portion 21a and includes the arcuate portion of the third sliding portion 24a.

A second mounting member 25a is connected to the first end 241a of the third sliding portion 24a. A third coupling member 251a and a third tightening strap 252a are mounted to the second mounting member 25a. The third tightening strap 252a includes a first end fixed to the third coupling member 251a and a second end connected to a third buckle 253a. The third buckle 253a is releasably coupled to the third coupling member 251a.

The mounting rack 20a further includes a second supporting rod 26a having a first end connected to the second mounting member 25a and a second end connected to the second end 242a of the third sliding portion 24a. The third coupling member 251a and the third tightening strap 252a are adjacent to the first end 241a of the third sliding portion 24a. A fourth coupling member 254a and a fourth tightening strap 255a are mounted to the second mounting member 25a. The fourth tightening strap 255a includes a first end fixed to the fourth coupling member 254a and a second end connected to a fourth buckle 256a. The fourth buckle 256a is releasably coupled to the fourth coupling member 254a.

Figure 12:
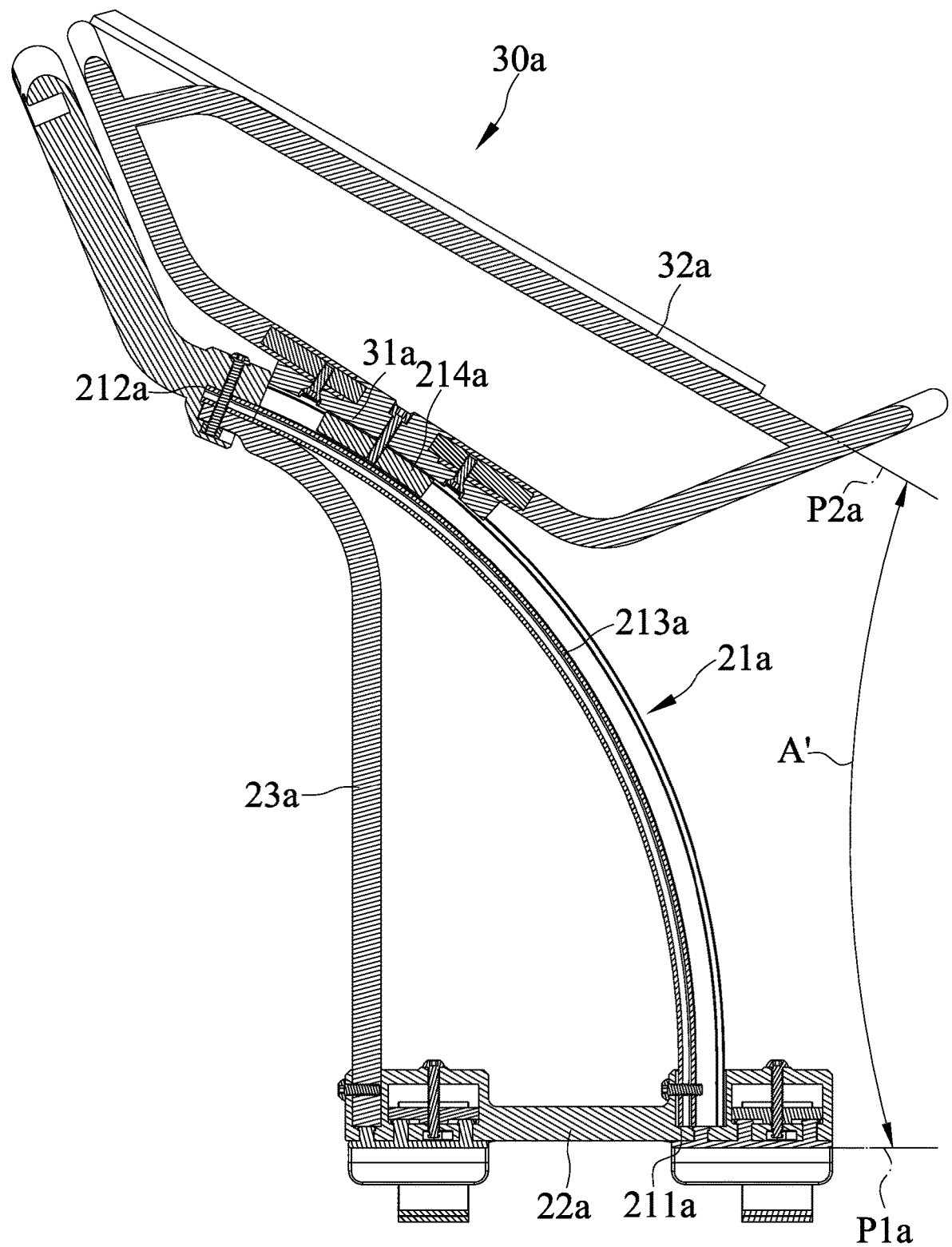
FIG. 12 is a cross sectional view illustrating a first sliding portion of the bicycle luggage rack of FIG. 10.

With reference to FIG. 12, the first mounting member 22a and the second mounting member 25a are located on a first reference plane P1a. The placement surface 32a is located on a second reference plane P2a at an angle A' to the first reference plane P1a. The angle A' between the first and second reference planes P1a and P2a is between 30° and 70°

The mounting rack 20a includes a connecting rod 27a that is substantially U-shaped. The connecting rod 27a includes a first end connected to the second end 212a of the first sliding portion 21a and a second end connected to the second end 242a of the third sliding portion 24a.

The mounting rack 20a includes a connecting rod 27a that is substantially U-shaped. The connecting rod 27a includes a first end connected to the second end 212a of the first sliding portion 21a and a second end connected to the second end 242a of the third sliding portion 24a.

The supporting rack 30a includes a fourth sliding portion 33a slidably mounted to the third sliding portion 24a. In this embodiment, the fourth sliding portion 33a is connected to the second sliding block 244a. The fourth sliding portion 33a is slidable along the arcuate portion between the first and second ends 241a and 242a of the third sliding portion 24a. The center of curvature of the third sliding portion 24a is located on a side of the third sliding portion 24a distant to the supporting rack 30a.

Figure 12A:
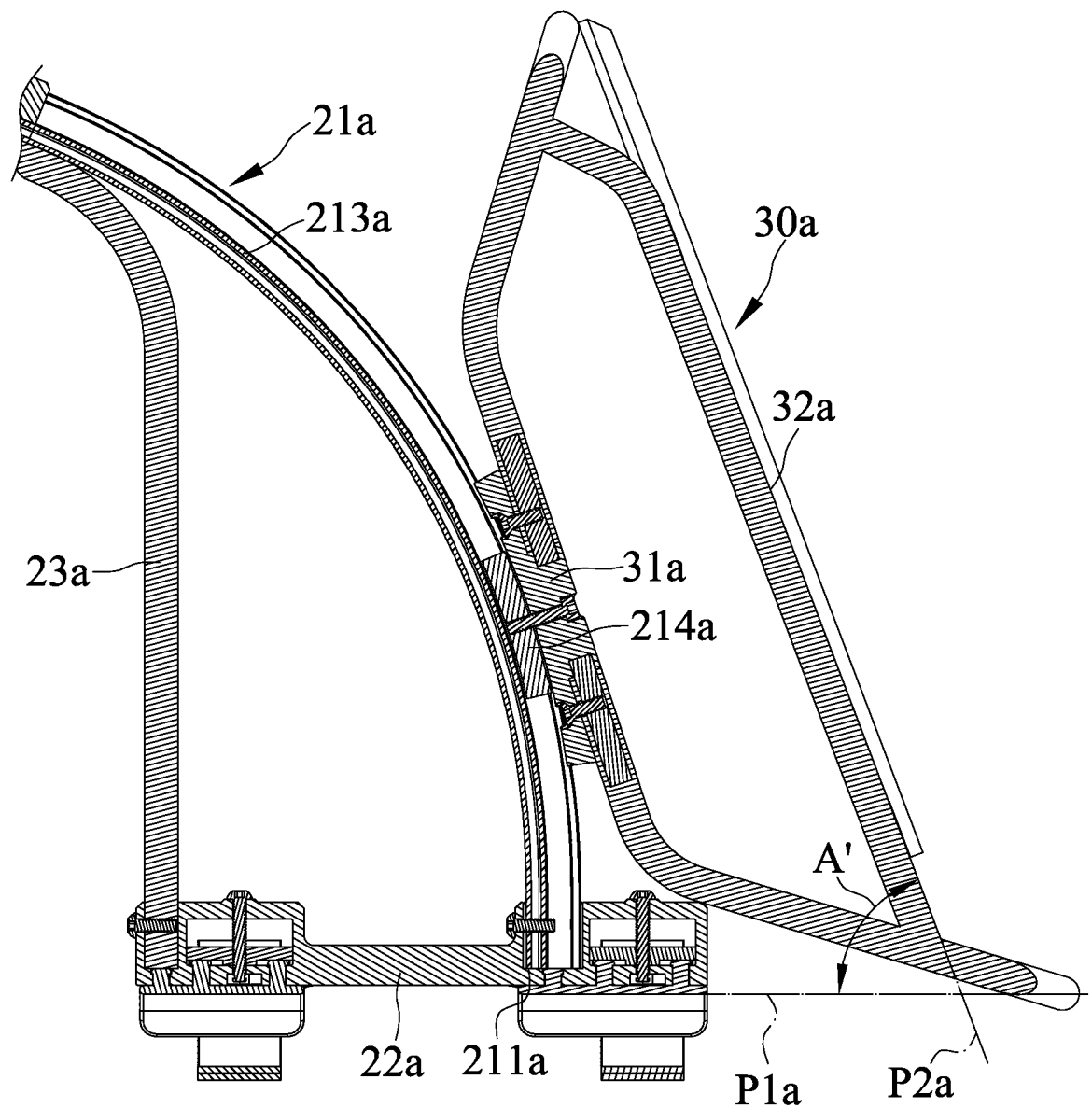
FIG. 12A is a cross sectional view similar to FIG. 12 with a supporting rack moved to the lowest position.
Figure 13:
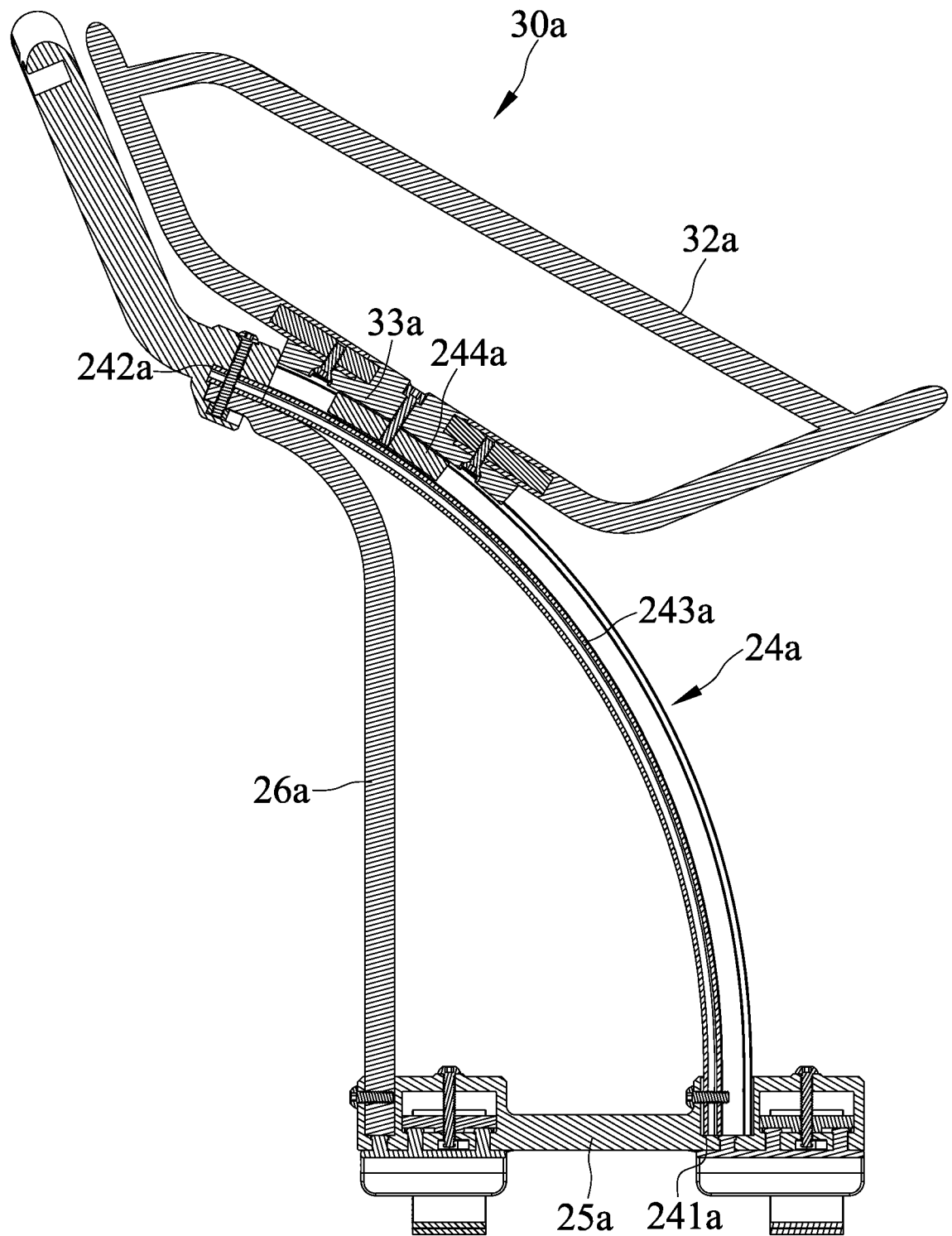
FIG. 13 is a cross sectional view illustrating a third sliding portion of the bicycle luggage rack of FIG. 10.
Figure 14:
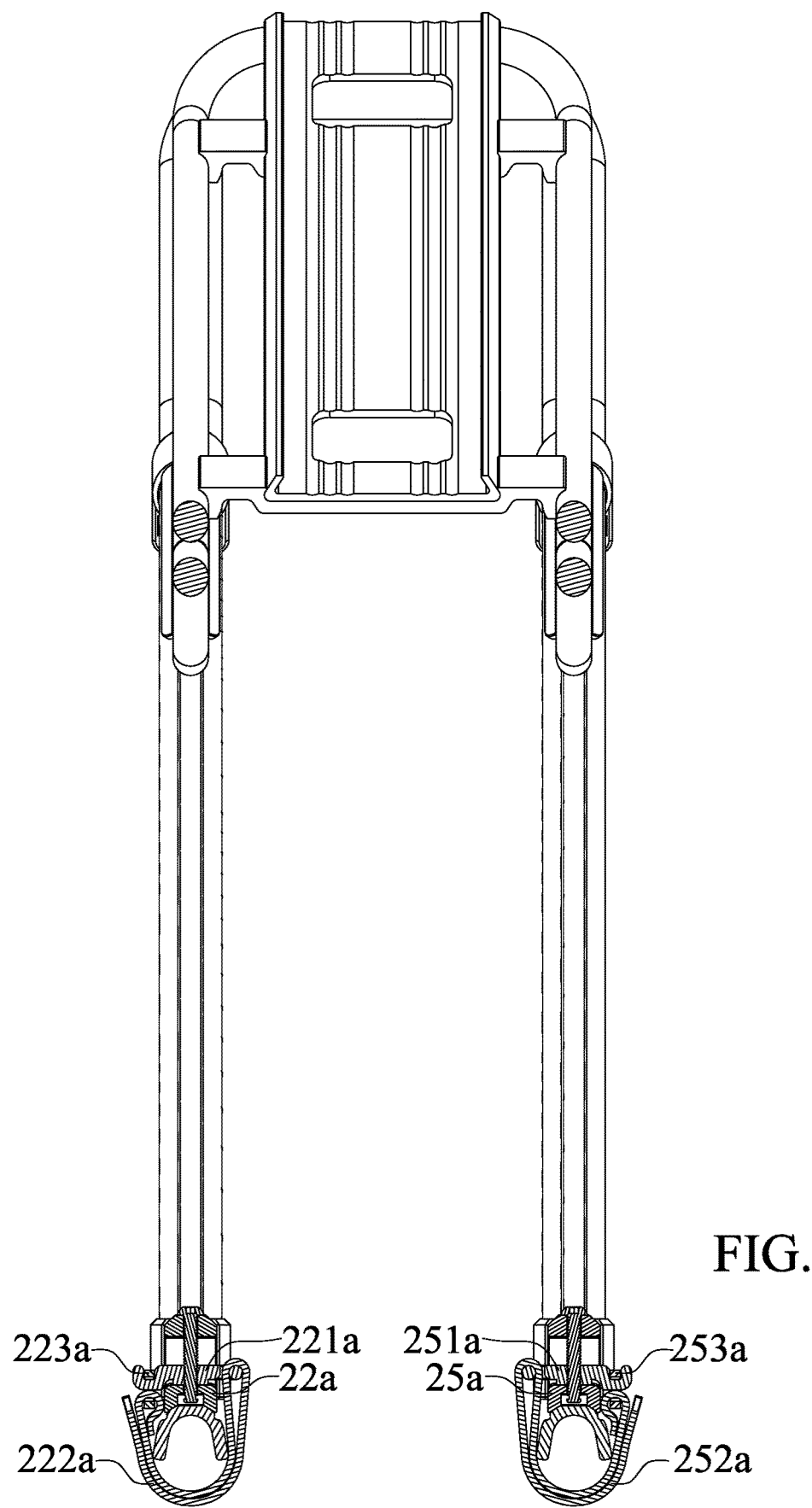
FIG. 14 is a cross sectional view illustrating a first tightening strap of the bicycle luggage rack of FIG. 10.
Figure 15:
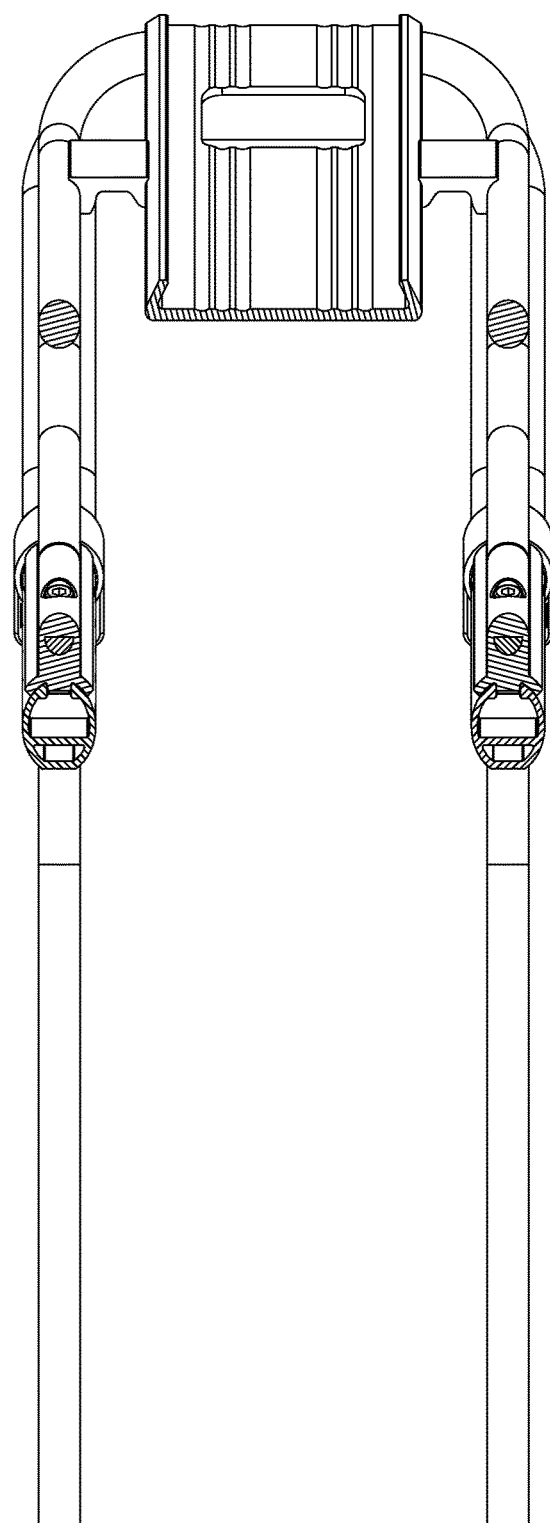
FIG. 15 is a cross sectional view illustrating a second tightening strap of the bicycle luggage rack of FIG. 10.
Figure 16:
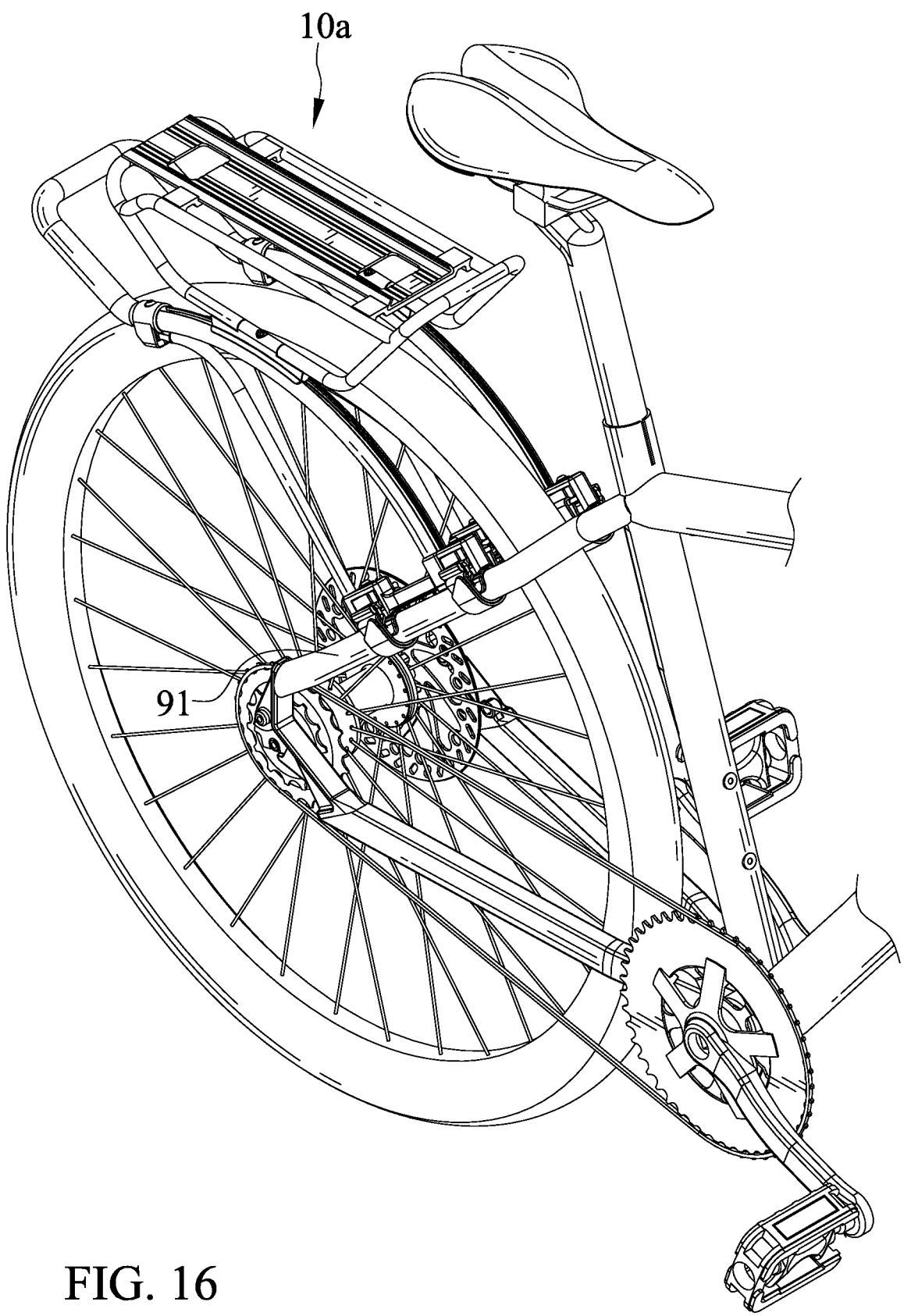
FIG. 16 is a diagrammatic perspective view illustrating use of the bicycle luggage rack of FIG. 10 on two tubes of a seat stay of a bicycle.

With reference to FIG. 16, the bicycle luggage rack 10a of the second embodiment according to the present invention can be mounted on two tubes of a seat stay 91 of a bicycle. The second embodiment is substantially the same as the first embodiment except that the length and the curvature of the first sliding portion 21a and the third sliding portion 24a are different from those in the first embodiment. As shown in FIGS. 12 and 12A, the angular position of the placement surface 32a is varied while the second sliding portion 31a slides along the arcuate portion of the first sliding portion 21a. Furthermore, the level of the placement surface 32a is varied while the second sliding portion 31a slides along the arcuate portion of the first sliding portion 21a. The bicycle luggage rack 10a can be used on various bicycle seat stays. Furthermore, by changing the angular position of the placement surface 32a, the placement surface 32a can be adjusted to locate in a horizontal plane while increasing the structural strength of the bicycle luggage rack 10a.

In view of the foregoing, the angle between the placement surface 32, 32a and the mounting rack 20, 20a and the level of the placement surface 32, 32a are varied while the second sliding portion 31, 31a slides along the arcuate portion of the first sliding portion 21, 21a. By such an arrangement, the bicycle luggage rack 10, 10a according to the present invention can be used on various bicycle frames of different sizes and angles.

Although specific embodiments have been illustrated and described, numerous modifications and variations are still possible without departing from the scope of the invention. The scope of the invention is limited by the accompanying claims.

The invention claimed is:

1. A bicycle luggage rack comprising:
   a mounting rack including a first sliding portion having a first end and a second end opposite to the first end, wherein the first sliding portion includes a first tube and a first sliding block slidably received in the first tube, wherein the first tube is mounted between the first and second ends of the first sliding portion and includes an arcuate portion between the first end and the second end; and
   a supporting rack disposed on top of the mounting rack, wherein the supporting rack includes a second sliding portion and a placement surface, wherein the second sliding portion is slidably disposed on the first sliding portion and is slidable along the arcuate portion between the first end and the second end of the first sliding portion, and wherein the second sliding portion is securely coupled to the first sliding block, permitting joint sliding movement of the second sliding portion and the first sliding block relative to the first tube, wherein an angle between the placement surface and the mounting rack is varied while the second sliding portion slides along the arcuate portion of the first sliding portion, and wherein a level of the placement surface is varied while the second sliding portion slides along the arcuate portion of the first sliding portion.

2. The bicycle luggage rack as claimed in claim 1, wherein a center of curvature of the first sliding portion is located on a side of the first sliding portion distant to the supporting rack.

3. The bicycle luggage rack as claimed in claim 1, wherein the mounting rack further includes a first mounting member connected to the first sliding portion, wherein a first coupling member and a first tightening strap are mounted to the first mounting member, wherein the first tightening strap includes a first end fixed to the first coupling member and a second end connected to a first buckle, and wherein the first buckle is releasably coupled to the first coupling member.

4. The bicycle luggage rack as claimed in claim 3, wherein the first end of the first sliding portion is connected to the first mounting member, wherein the mounting rack includes a first supporting rod having a first end connected to the first mounting member and a second end connected to the second end of the first sliding portion.

5. The bicycle luggage rack as claimed in claim 4, wherein the first coupling member and the first tightening strap are adjacent to the first end of the first sliding portion, wherein a second coupling member and a second tightening strap are mounted to the first mounting member, wherein the second tightening strap includes a first end fixed to the second coupling member and a second end connected to a second buckle, and wherein the second buckle is releasably coupled to the second coupling member.

6. The bicycle luggage rack as claimed in claim 5, wherein the mounting rack includes a third sliding portion having a first end and a second end opposite to the first end, wherein the third sliding portion further includes an arcuate portion between the first end and the second end of the third sliding portion, wherein the third sliding portion includes a second tube and a second sliding block slidably received in the second tube, wherein the second tube is mounted between the first and second ends of the third sliding portion and includes the arcuate portion of the third sliding portion,
   wherein a second mounting member is connected to the first end of the third sliding portion, wherein a third coupling member and a third tightening strap are mounted to the second mounting member, wherein the third tightening strap includes a first end fixed to the third coupling member and a second end connected to a third buckle, wherein the third buckle is releasably coupled to the third coupling member,
   wherein the mounting rack includes a second supporting rod having a first end connected to the second mounting member and a second end connected to the second end of the third sliding portion, wherein the third coupling member and the third tightening strap are adjacent to the first end of the third sliding portion,
   wherein a fourth coupling member and a fourth tightening strap are mounted to the second mounting member, wherein the fourth tightening strap includes a first end fixed to the fourth coupling member and a second end connected to a fourth buckle, wherein the fourth buckle is releasably coupled to the fourth coupling member,
   wherein the supporting rack includes a fourth sliding portion connected to the second sliding block, wherein the fourth sliding portion is slidable along the arcuate portion between the first and second ends of the third sliding portion, wherein a center of curvature of the third sliding portion is located on a side of the third sliding portion distant to the supporting rack.

7. The bicycle luggage rack as claimed in claim 6, wherein the mounting rack includes a connecting rod that is substantially U-shaped, wherein the connecting rod includes a first end connected to the second end of the first sliding portion and a second end connected to the second end of the third sliding portion.

8. The bicycle luggage rack as claimed in claim 6, wherein the first mounting member and the second mounting member are located on a first reference plane, wherein the placement surface is located on a second reference plane at an angle to the first reference plane, and wherein the angle between the first and second reference planes is between 65° and 90°.

9. The bicycle luggage rack as claimed in claim 6, wherein the first mounting member and the second mounting member are located on a first reference plane, wherein the placement surface is located on a second reference plane at an angle to the first reference plane, and wherein the angle between the first and second reference planes is between 30° and 70°.

\* \* \* \* \*